US010072561B2

(12) United States Patent
Gong et al.

(10) Patent No.: US 10,072,561 B2
(45) Date of Patent: Sep. 11, 2018

(54) PISTON

(71) Applicant: Caterpillar Inc., Peoria, IL (US)

(72) Inventors: Weidong Gong, Dunlap, IL (US);
David Yu-Zhang Chang, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 163 days.

(21) Appl. No.: 15/218,134

(22) Filed: Jul. 25, 2016

(65) Prior Publication Data

US 2018/0023454 A1    Jan. 25, 2018

(51) Int. Cl.
| F02B 23/06 | (2006.01) |
| F02B 17/00 | (2006.01) |
| F02F 1/00 | (2006.01) |
| F02F 1/24 | (2006.01) |
| F02F 3/24 | (2006.01) |

(52) U.S. Cl.
CPC ........ F02B 23/0651 (2013.01); F02B 17/005 (2013.01); F02B 23/0627 (2013.01); F02F 1/00 (2013.01); F02F 1/24 (2013.01); F02F 3/24 (2013.01)

(58) Field of Classification Search
CPC ........................ F02B 23/0627; F02B 23/0651; F02B 17/005; F02F 1/00; F02F 1/24; F02F 3/24
USPC .............................................. 123/193.6, 294
See application file for complete search history.

(56) References Cited

U.S. PATENT DOCUMENTS

| 5,065,715 | A | * | 11/1991 | Evans | ................... F02B 23/08 123/263 |
| 6,227,174 | B1 | * | 5/2001 | Hedrick | ................ F02M 49/04 123/495 |
| 6,729,290 | B1 | | 5/2004 | Rorke | |
| 7,353,797 | B1 | | 4/2008 | Breidenthal | |
| 8,459,229 | B2 | * | 6/2013 | Rothbauer | .......... F02B 23/0651 123/276 |
| 8,683,974 | B2 | * | 4/2014 | Bandyopadhyay | ....... F02F 3/00 123/193.6 |
| 8,881,706 | B2 | * | 11/2014 | Augot | ................. F02B 23/0672 123/193.1 |
| 9,194,344 | B1 | * | 11/2015 | Foege | ..................... F02D 19/10 |
| 2011/0253096 | A1 | * | 10/2011 | Easley | ................ F02B 23/0624 123/294 |

(Continued)

FOREIGN PATENT DOCUMENTS

| DE | 3805009 | 8/1989 |
| DE | 19640005913 | 5/1998 |

(Continued)

*Primary Examiner* — Marguerite McMahon

(57) ABSTRACT

A piston for an engine is provided. The piston includes a body having a crown disposed about a central axis. The crown includes an inner circumference and an outer circumference. The piston includes a central chamber transversely disposed within the body and recessed with respect to the crown. The piston includes a central mound disposed within the central chamber about the central axis. The piston also includes a bowl extending from the central mound towards the crown. The piston further includes a passageway provided on the inner circumference of the crown. The passageway includes a slot defined by a first surface inclined at a first angle with respect to the central axis. The slot is adapted to allow flow of a fuel from the central chamber towards the outer circumference of the crown.

17 Claims, 4 Drawing Sheets

(56) References Cited

U.S. PATENT DOCUMENTS

| | | | |
|---|---|---|---|
| 2014/0331961 A1* | 11/2014 | Ness | F02F 3/28 123/294 |
| 2015/0107543 A1 | 4/2015 | Bowing et al. | |
| 2015/0308371 A1* | 10/2015 | Eismark | F02B 23/0627 123/193.6 |
| 2016/0138517 A1* | 5/2016 | Katari | F02B 23/06 123/193.6 |
| 2016/0169172 A1* | 6/2016 | Meek | F02M 43/04 123/472 |

FOREIGN PATENT DOCUMENTS

| | | |
|---|---|---|
| JP | S59119014 | 7/1984 |
| JP | H09303149 | 11/1997 |

\* cited by examiner

PISTON

TECHNICAL FIELD

The present disclosure relates to a piston for an engine. More particularly, the present disclosure relates to the piston having a crown, a central chamber, and a passageway therebetween to improve mixing of a charge within a cylinder.

BACKGROUND

Engines such as, Direct Injected Gas (DIG) engines employ direct injection of fuel at high pressure into a cylinder for combustion. The fuel used may be a combination of two fuels, such as natural gas and diesel, in the ratio of up to 99:1. The two fuels may be directly injected into the cylinder when an intake valve thereof may be closed. In such a situation, diesel may serve as a pilot fuel for ignition of the natural gas within the cylinder.

Due to the direct injection of the fuel within the cylinder, time available for adequate mixing of the fuel with air present within the cylinder may be limited. As a result, the mixing of the fuel and the air may remain localized and/or non-homogenized within the cylinder. This in turn may result in incomplete combustion of the fuel within the cylinder. The incomplete combustion may further result in reduced overall engine efficiency, increased maintenance schedules, increased emissions such as Particulate Matter (PM), unburned Hydrocarbon (HC), and so on.

U.S. Published Application Number 2015/0107543 describes a piston for an internal combustion engine. The piston includes a piston skirt with a center axis. The piston includes a piston crown disposed adjacent a top of the piston skirt. The piston crown includes a diameter D. The piston crown includes a piston crown margin of width b extending in a circumferential direction. The piston crown also includes a piston trough with a depth t. The piston trough further includes a piston trough wall with a base diameter. The piston trough includes at least one recess with a height h. The height h parallel to a direction of the center axis satisfies the requirement: $0.2\ t <= h <= t$.

SUMMARY OF THE DISCLOSURE

In an aspect of the present disclosure, a piston for an engine is provided. The piston includes a body having a crown disposed about a central axis. The crown includes an inner circumference and an outer circumference. The piston includes a central chamber transversely disposed within the body and recessed with respect to the crown. The piston includes a central mound disposed within the central chamber about the central axis. The piston also includes a bowl extending from the central mound towards the crown. The piston further includes a passageway provided on the inner circumference of the crown. The passageway includes a slot defined by a first surface inclined at a first angle with respect to the central axis. The slot is adapted to allow flow of a fuel from the central chamber towards the outer circumference of the crown.

In another aspect of the present disclosure, an engine is provided. The engine includes a cylinder head and an engine block. The engine includes a cylinder provided within the engine block. The cylinder defines an inner surface thereof. The engine also includes a fuel injector provided within the cylinder. The fuel injector is adapted to inject a fuel at a spray angle within the cylinder. The engine further includes a piston provided within the cylinder. The piston includes a body having a crown disposed about a central axis. The crown includes an inner circumference and an outer circumference. The piston includes a central chamber transversely disposed within the body and recessed with respect to the crown. The piston includes a central mound disposed within the central chamber about the central axis. The piston also includes a bowl extending from the central mound towards the crown. The piston further includes a passageway provided on the inner circumference of the crown. The passageway includes a slot defined by a first surface inclined at a first angle with respect to the central axis. The slot is adapted to allow flow of a fuel from the central chamber towards the outer circumference of the crown.

Other features and aspects of this disclosure will be apparent from the following description and the accompanying drawings.

DETAILED DESCRIPTION

Figure 1:
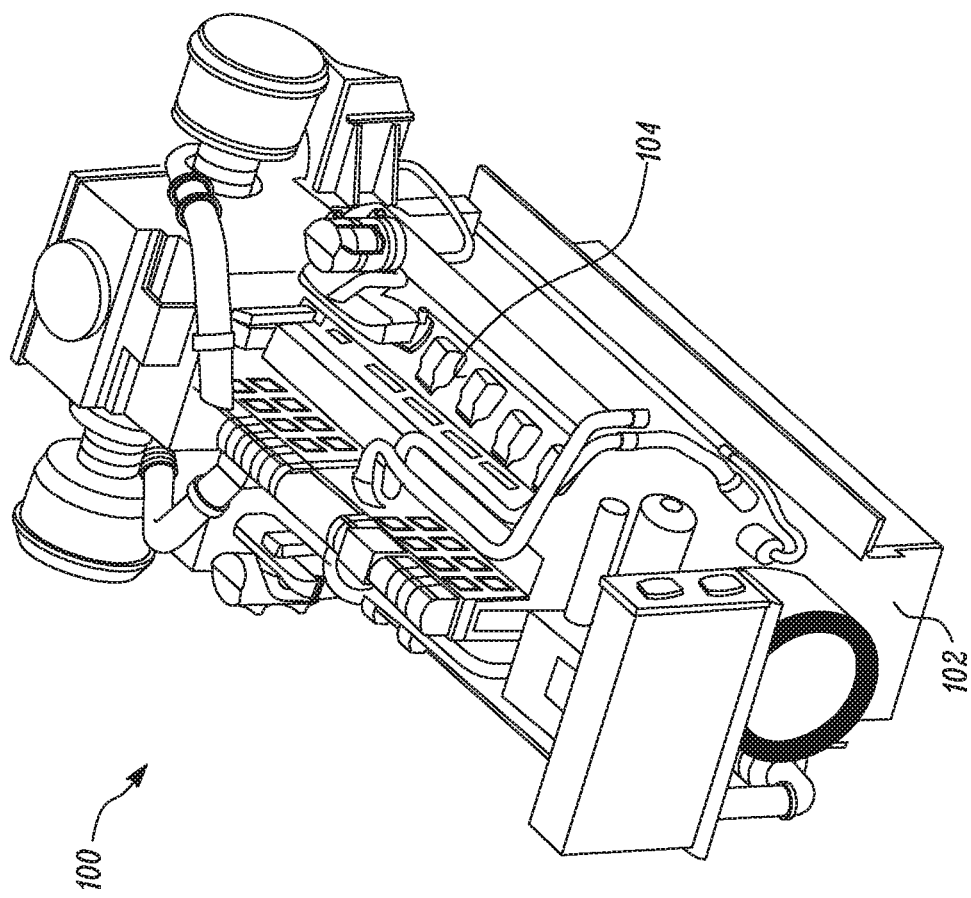
FIG. 1 is a perspective view of an exemplary engine, according to one embodiment of the present disclosure.

Wherever possible, the same reference numbers will be used throughout the drawings to refer to the same or the like parts. Referring to FIG. 1, an exemplary engine 100 is illustrated. The engine 100 is an internal combustion engine powered by any fuel known in the art, such as natural gas, diesel, or a combination thereof. More specifically, in the illustrated embodiment, the engine 100 is a Direct Injected Gas (DIG) engine. As such, the engine 100 employs two fuels for combustion, viz., a combination of natural gas and diesel. The natural gas and diesel may be simultaneously or sequentially injected into a cylinder 202 (shown in FIG. 2) of the engine 100, based on application requirements, in a ratio of up to 99:1 and may vary based on application requirements. The two fuels may be directly injected into the cylinder 202, simultaneously or sequentially, by a fuel injector 204 (shown in FIG. 2) known in the art adapted for dual fuel injection.

In other embodiments, the engine 100 may employ a single fuel for combustion such as natural gas or diesel based on application requirements. The single fuel may be directly injected into the cylinder 202 of the engine 100 by any fuel injector known in the art and based on application requirements. The engine 100 may be used for applications including, but not limited to, power generation, transportation, construction, agriculture, forestry, aviation, marine, material handling, and waste management.

The engine 100 includes an engine block 102. The engine block 102 includes one or more cylinders 202 provided therein. The cylinders 202 may be arranged in any configuration such as inline, radial, "V", and so on. The engine 100 also includes a cylinder head 104 mounted on the engine block 102. The cylinder head 104 houses one or more components and/or systems (not shown) of the engine 100 such as a valve train, an intake manifold, an exhaust manifold, sensors, and so on. Additionally, the engine 100 may include various other components and/or systems (not shown) such as a crankcase, a fuel system, an air system, a cooling system, a turbocharger, an exhaust gas recirculation system, an exhaust aftertreatment system, other peripheries, and so on.

Figure 2:
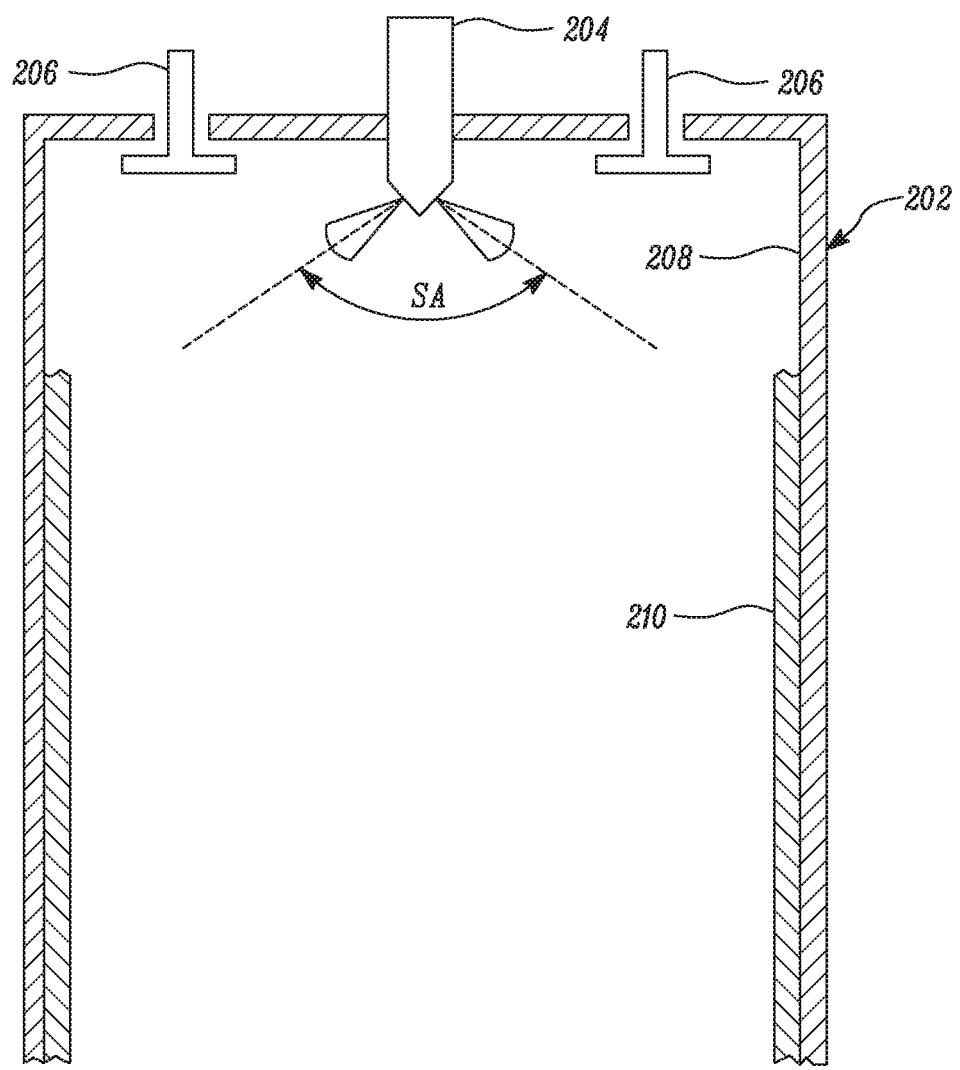
FIG. 2 is a schematic representation of a spray angle of a fuel injector of the engine of FIG. 1, according to one embodiment of the present disclosure.

Referring to FIG. 2, the engine 100 includes the fuel injector 204 provided within the cylinder 202. More specifically, the fuel injector 204 is disposed at a Top Dead Center (TDC) position within the cylinder 202. The fuel injector 204 may be any fuel injector known in the art adapted for dual fuel injection. More specifically, the fuel injector 204 may include separate set of nozzles (not shown) for injection of the two fuels.

The fuel injector 204 may inject the two fuels into the cylinder 202 in the form of an atomized spray having a spray angle SA. The spray angle SA may lie in a range between 120° and 160°, but may vary based on application requirements. It should be noted that the spray angle SA and geometry thereof for the two fuels may be different from one another and may vary based on application requirements.

Figure 3:
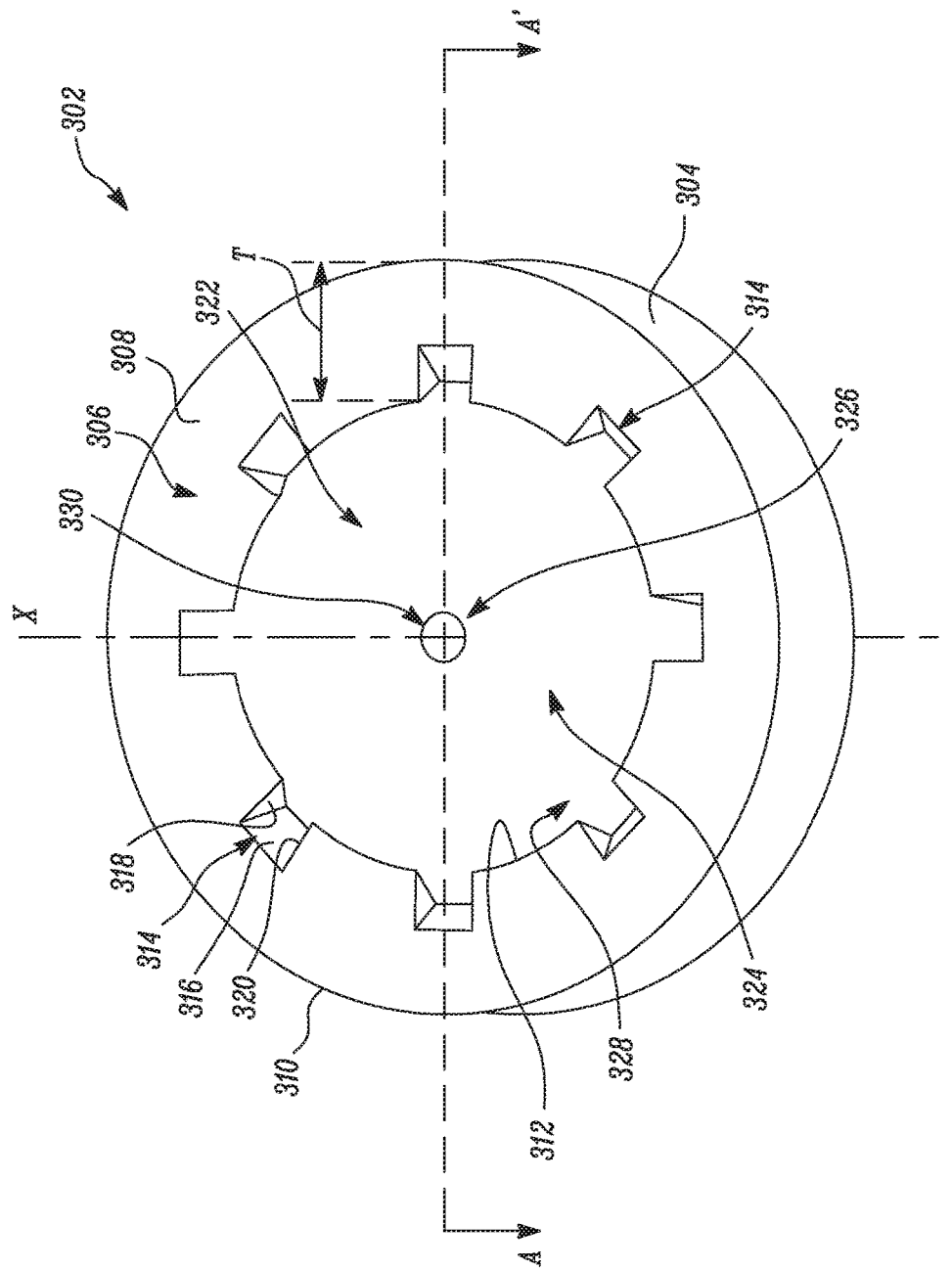
FIG. 3 is a perspective view of a piston of the engine of FIG. 1, according to one embodiment of the present disclosure.
Figure 4:
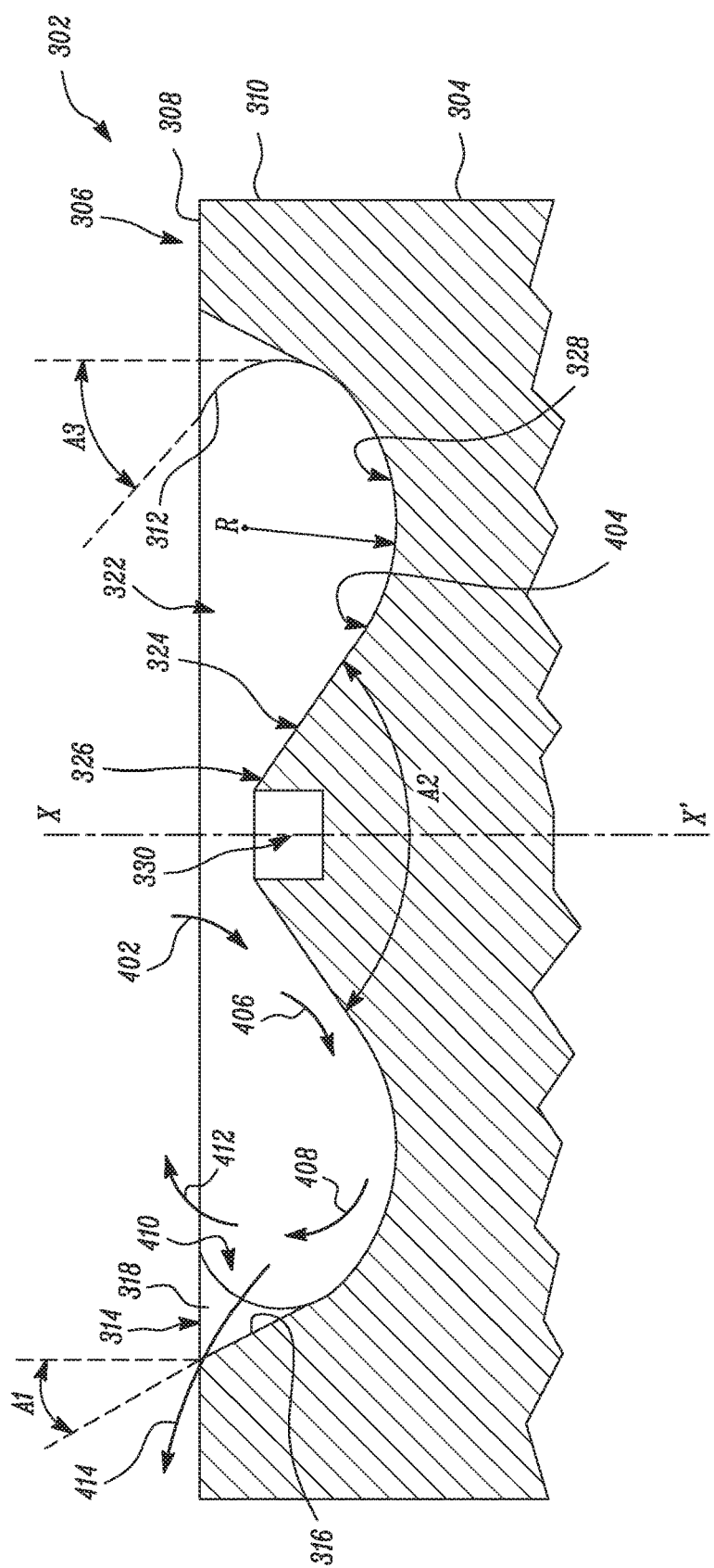
FIG. 4 is a cross sectional view of the piston of FIG. 3 along a section A-A', according to one embodiment of the present disclosure.

The present disclosure relates to a piston 302 of the engine 100. Referring to FIG. 3, a perspective view of the piston 302 is illustrated. Also, referring to FIG. 4, a cross sectional view of the piston 302 along a section A-A' is illustrated. The piston 302 will now be explained with reference to FIGS. 3 and 4. The piston 302 is provided within the cylinder 202 of the engine 100. The piston 302 translates within the cylinder 202 between a TDC position and a Bottom Dead Center (BDC) position. More specifically, the piston 302 translates between the TDC position and the BDC position during an intake stroke, a compression stroke, an expansion stroke, and an exhaust stroke of the engine 100.

The piston 302 includes a body 304. The body 304 defines a central axis X-X'. The body 304 includes a crown 306 having a top surface 308. The crown 306 is disposed about the central axis X-X'. The crown 306 includes an outer circumference 310 and an inner circumference 312. Accordingly, the crown 306 includes a thickness T of the top surface 308 defined between the outer circumference 310 and the inner circumference 312.

The piston 302 includes a passageway provided on the crown 306. More specifically, the passageway includes a slot 314 provided on the inner circumference 312 of the crown 306. The slot 314 extends from the inner circumference 312 of the crown 306 at least part way along the top surface 308 towards the outer circumference 310 of the crown 306. The slot 314 includes a first surface 316, a second surface 318, and a third surface 320. Each of the first surface 316, the second surface 318, and the third surface 320 has a flat configuration.

The first surface 316 is inclined at a first angle A1 with respect to the central axis X-X'. The first angle A1 may lie in a range between 30° and 60° and may vary based on application requirements. The second surface 318 and the third surface 320 are substantially perpendicular to the first surface 316. In the illustrated embodiment, the second surface 318 and the third surface 320 are parallel to one another. In another embodiment, the second surface 318 and the third surface 320 may be oriented at an angle with respect to one another. Accordingly, the first surface 316, the second surface 318, and the third surface 320 define a triangular configuration of the slot 314.

In the illustrated embodiment, the piston 302 includes a number of slots 314 provided on the inner circumference 312 of the crown 306. More specifically, the crown 306 includes eight slots 314 provided thereon. Each of the slots 314 is provided in a spaced apart arrangement with respect to one another. The number of the slots 314 and/or an arrangement thereof on the crown 306 is merely exemplary and may vary based on application requirements. Also, in other embodiments, the configuration of the slot 314 may vary such as having a curved configuration, a stepped configuration, and so on. The slot 314 and a function thereof will be explained in more detail later.

The piston 302 includes a central chamber 322 disposed within the body 304. The central chamber 322 has a hollow configuration. More specifically, the central chamber 322 is disposed transversely within the body 304 with respect to the central axis X-X'. Also, the central chamber 322 is recessed with respect to the top surface 308 of the crown 306 along the central axis X-X'. The central chamber 322 is adapted to receive a flow of the fuel from the fuel injector 204 and air from one or more valves 206 (shown in FIG. 2) of the cylinder 202 therein for combustion as shown by arrow 402.

The piston 302 includes a central mound 324 disposed within the central chamber 322. The central mound 324 has a conical configuration having an apex 326 and a base 404. Accordingly, the central mound 324 defines a second angle A2. The second angle A2 lies in a range between 120° and 160° and may vary based on application requirements. More specifically, the second angle A2 corresponds to the spray angle SA of the fuel injector 204.

The central mound 324 is disposed within the central chamber 322 about the central axis X-X'. More specifically, the central mound 324 is disposed within the central chamber 322 in a manner such that the base 404 of the central mound 324 is distal with respect to the top surface 308 of the crown 306. Also, the central mound 324 is centrally disposed within the central chamber 322 in a manner such that the central axis X-X' passes through the apex 326 of the central mound 324 and perpendicular to the base 404. The central mound 324 is adapted to direct the flow of the fuel within the central chamber 322 away from the central axis X-X' and/or towards the inner circumference 312 of the crown 306 as shown by arrow 406.

The piston 302 also includes a bowl 328 provided within the central chamber 322. The bowl 328 is provided in connection with the central mound 324 and the crown 306 of the piston 302. More specifically, the bowl 328 extends from the base 404 of the central mound 324 towards the inner circumference 312 of the crown 306. The bowl 328 includes a curved configuration defining a radius R. The radius R includes values in a range of R16 and R25 and may vary based on application requirements. The bowl 328 is adapted to direct the flow of the fuel from the base 404 of the central mound 324 towards the top surface 308 of the crown 306 as shown by arrow 408.

The piston 302 further includes a re-entrant portion 410 provided within the central chamber 322. More specifically, the re-entrant portion 410 is provided on the inner circumference 312 of the crown 306 and adjacent to the top surface 308 of the crown 306. The re-entrant portion 410 extends from the bowl 328 towards the top surface 308 of the crown 306. The re-entrant portion 410 protrudes within the central chamber 322 in a manner such that the re-entrant portion 410 defines a third angle A3 with respect to the central axis X-X'. The third angle A3 lies in a range between 10° and 30° and may vary based on application requirements. The re-entrant portion 410 is adapted to redirect a portion of the flow of the fuel into the central chamber 322 as shown by arrow 412.

A remaining portion of the flow of the fuel is directed through the slot 314 as shown by arrow 414. Accordingly, the slot 314 is adapted to allow the remaining portion of the flow of the fuel from the central chamber 322 towards the outer circumference 310 of the crown 306. More specifically, the slot 314 is adapted to allow the remaining portion of the flow of the fuel from the central chamber 322 towards an inner surface 208 (see FIG. 2) of the cylinder 202. In some embodiments, the engine 100 may include a liner 210 (see FIG. 2) provided within the cylinder 202 between the inner surface 208 of the cylinder 202 and the outer circumference 310 of the crown 306. In such a situation, the slot 314 may be adapted to allow the remaining portion of the flow of the fuel from the central chamber 322 towards the liner 210.

It should be noted that the slot 314 described herein is merely exemplary. In other embodiments, additionally or optionally, the piston 302 may include one or more slots (not shown) provided within the crown 306. The slots may extend between the inner circumference 312 and the top surface 308 of the crown 306. The slots may be adapted to allow the remaining portion of the flow of the fuel from the central chamber 322 towards the outer circumference 310 of the crown 306, the inner surface 208 of the cylinder 202, and/or the liner 210.

Additionally or optionally, the piston 302 includes a bore 330 provided in the central mound 324. More specifically, the bore 330 is provided along the central axis X-X'. The bore 330 extends from the apex 326 at least part way towards the base 404 of the central mound 324. The bore 330 is adapted to engage with an assembly tool (not shown). As such, the piston 302 may be assembled and/or disassembled by engaging the piston 302 with the assembly tool via the bore 330.

INDUSTRIAL APPLICABILITY

The present disclosure relates to the piston 302 having the crown 306 and the central chamber 322. The fuel injected by the fuel injector 204 is received into the central chamber 322 as shown by the arrow 402. The piston 302 includes the central mound 324 provided within the central chamber 322. The central mound 324 directs the flow of the fuel received into the central chamber 322 away from the central axis X-X' towards the inner circumference 312 of the crown 306 as shown by the arrow 406. The piston 302 includes the bowl 328 provided within the central chamber 322. The bowl 328 directs the flow of the fuel away from the base 404 of the central mound 324 towards the top surface 308 of the crown 306 as shown by the arrow 408.

The piston 302 also includes the re-entrant portion 410 provided on the inner circumference 312 of the crown 306. The re-entrant portion 410 redirects the portion of the flow of the fuel away from the inner circumference 312 of the crown 306 and further into the central chamber 322 as shown by the arrow 412. The piston 302 further includes the slot 314 provided on the inner circumference 312 of the crown 306. The slot 314 allows the remaining portion of the flow of the fuel away from the central chamber 322 towards the outer circumference 310 of the crown 306, the inner surface 208 of the cylinder 202, and/or the liner 210 as shown by arrow 414.

The piston 302 allows mixing of the portion of the fuel with the air present within the central chamber 322. The piston 302 also allows mixing of the remaining portion of the fuel with the air present above the central chamber 322 and adjacent to the inner surface 208 of the cylinder 202 and/or the liner 210. As a result, localized mixing of the fuel and the air is reduced, in turn leading to improved and homogenized mixing of the fuel and the air within the cylinder 202. This further leads to improved combustion within the cylinder 202 resulting in reduced particulate matter, reduced unburned hydrocarbon, reduced maintenance schedules, improved fuel/overall engine efficiency, and so on.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A piston for an engine, the piston comprising:
   a body having a crown disposed about a central axis, the crown having an inner circumference and an outer circumference;
   a central chamber transversely disposed within the body and recessed with respect to the crown;
   a central mound disposed within the central chamber about the central axis;
   a bowl extending from the central mound towards the crown; and
   a passageway provided on the inner circumference of the crown, the passageway including a slot defined by a first surface inclined at a first angle between 30° and 60° with respect to the central axis, wherein the slot is adapted to allow flow of a fuel from the central chamber towards the outer circumference of the crown.

2. The piston of claim 1 further including a plurality of the slots provided in a spaced apart arrangement from each other along the inner circumference of the crown.

3. The piston of claim 1, wherein the passageway further includes a second surface and a third surface such that the slot defined by the first surface, the second surface, and the third surface has a triangular configuration.

4. The piston of claim 1, wherein the central mound has a conical shape such that the central mound defines a second angle corresponding to a spray angle of a fuel injector.

5. The piston of claim 4, wherein the second angle is between 120° and 160°.

6. The piston of claim 1 further including a re-entrant portion provided along the inner circumference of the crown, wherein the re-entrant portion defines a third angle with respect to the central axis.

7. The piston of claim 6, wherein the third angle is between 10° and 30°.

8. The piston of claim 1, wherein the central mound further includes a bore provided thereon, the bore adapted to engage with an assembly tool.

9. An engine comprising:
   a cylinder head;
   an engine block;
   a cylinder provided within the engine block, the cylinder defining an inner surface;
   a fuel injector provided within the cylinder, the fuel injector adapted to inject a fuel at a spray angle within the cylinder; and
   a piston provided within the cylinder, the piston comprising:

a body having a crown disposed about a central axis, the crown having an inner circumference and an outer circumference;

a central chamber transversely disposed within the body and recessed with respect to the crown;

a central mound disposed within the central chamber about the central axis;

a bowl extending from the central mound towards the crown; and a passageway provided on the inner circumference of the crown, the passageway including a slot defined by a first surface inclined at a first angle between 30° and 60° with respect to the central axis, wherein the slot is adapted to allow flow of a fuel from the central chamber towards the inner surface of the cylinder.

10. The engine of claim 9, wherein the passageway further includes a second surface and a third surface such that the slot defined by the first surface, the second surface, and the third surface has a triangular configuration.

11. The engine of claim 9 further includes a liner provided between the outer circumference of the piston and the inner surface of the cylinder.

12. The engine of claim 9, wherein the central mound has a conical shape such that the central mound defines a second angle corresponding to the spray angle of the fuel injector.

13. The engine of claim 12, wherein the second angle is between 120° and 160°.

14. The engine of claim 9 further including a re-entrant portion provided along the inner circumference of the crown, wherein the re-entrant portion defines a third angle with respect to the central axis.

15. The engine of claim 14, wherein the third angle is between 10° and 30°.

16. The engine of claim 9, wherein the central mound further includes a bore provided thereon, the bore adapted to engage with an assembly tool.

17. The engine of claim 9, wherein the fuel is at least one of natural gas and diesel.

* * * * *